United States Patent
Barrett et al.

(10) Patent No.: US 10,159,101 B2
(45) Date of Patent: Dec. 18, 2018

(54) USING WLAN CONNECTIVITY OF A WIRELESS DEVICE

(71) Applicant: BlackBerry Limited, Waterloo (CA)

(72) Inventors: Stephen John Barrett, Heath (GB); Stephen McCann, Southampton (GB); Nicholas James Russell, Newbury (GB); Anders Fredrik Chronqvist, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 148 days.

(21) Appl. No.: 15/160,126

(22) Filed: May 20, 2016

(65) Prior Publication Data

US 2017/0339727 A1    Nov. 23, 2017

(51) Int. Cl.
*H04W 76/11*    (2018.01)
*H04L 12/26*    (2006.01)
(Continued)

(52) U.S. Cl.
CPC ......... *H04W 76/11* (2018.02); *H04L 43/0811* (2013.01); *H04L 43/0888* (2013.01); *H04L 43/16* (2013.01); *H04L 61/1511* (2013.01); *H04L 61/2007* (2013.01); *H04L 61/2015* (2013.01); *H04L 61/6022* (2013.01); *H04L 63/0485* (2013.01); *H04W 4/08* (2013.01); *H04W 12/08* (2013.01); *H04W 40/22* (2013.01); *H04L 61/103* (2013.01); *H04L 61/256* (2013.01); *H04L 61/2514* (2013.01);
(Continued)

(58) Field of Classification Search
CPC ............... H04L 43/16; H04L 61/2007; H04L 61/6022; H04L 63/0485; H04W 40/22; H04W 76/021; H04W 80/06
See application file for complete search history.

(56) References Cited

U.S. PATENT DOCUMENTS

2011/0202970 A1* 8/2011 Kato .................. H04L 12/2859 726/1
2011/0296006 A1 12/2011 Krishnaswamy
(Continued)

FOREIGN PATENT DOCUMENTS

CN    103634934    3/2014

OTHER PUBLICATIONS

R. Fielding et al., Internet Engineering Task Force (IETF) Request for Comments: 7230, Obsoletes: 2145, 2616, Updates: 2817, 2818, Category: Standards Track, ISSN: 2070-1721, Hypertext Transfer Protocol (HTTP/1.1): Message Syntax and Routing, Jun. 2014 (89 pages).

(Continued)

*Primary Examiner* — Kan Yuen
(74) *Attorney, Agent, or Firm* — Trop, Pruner & Hu, P.C.

(57) ABSTRACT

In some examples, a first wireless device communicates with a group device that wirelessly interconnects a plurality of wireless devices in a group, to obtain, from the group device, information identifying a second wireless device from which the first wireless device is able to use a wireless connectivity of the second wireless device to a wide area network (WAN), the second wireless device being part of the plurality of wireless devices. The first wireless device communicates data over the WAN using the wireless connectivity of the second wireless device.

14 Claims, 8 Drawing Sheets

(51) Int. Cl.

| | | |
|---|---|---|
| *H04L 29/12* | (2006.01) | |
| *H04L 29/06* | (2006.01) | |
| *H04W 40/22* | (2009.01) | |
| *H04W 4/08* | (2009.01) | |
| *H04W 12/08* | (2009.01) | |
| *H04W 80/06* | (2009.01) | |
| *H04W 80/04* | (2009.01) | |
| *H04W 84/12* | (2009.01) | |
| *H04W 4/80* | (2018.01) | |
| *H04W 8/18* | (2009.01) | |

(52) U.S. Cl.
CPC ...... *H04L 61/2517* (2013.01); *H04L 61/2592* (2013.01); *H04W 4/80* (2018.02); *H04W 8/186* (2013.01); *H04W 80/04* (2013.01); *H04W 80/06* (2013.01); *H04W 84/12* (2013.01)

(56) References Cited

U.S. PATENT DOCUMENTS

| 2012/0218942 | A1* | 8/2012 | Lu | H04W 28/06 |
| | | | | 370/328 |
| 2014/0056209 | A1* | 2/2014 | Park | H04W 88/04 |
| | | | | 370/315 |
| 2014/0370811 | A1* | 12/2014 | Kang | H04W 84/18 |
| | | | | 455/41.2 |
| 2016/0261722 | A1* | 9/2016 | Paasch | H04L 47/193 |

OTHER PUBLICATIONS

Wikipedia, Dynamic Host Configuration Protocol last modified on Mar. 16, 2016 (33 pages).
J. Reschke, Internet Engineering Task Force (IETF), Request for Comments: 7237, Category: Informational, ISSN: 2070-1721, Initial Hypertext Transfer Protocol (HTTP) Method Registrations, Jun. 2014 (11 pages).
Wikipedia, Hypertext Transfer Protocol last modified on Mar. 16, 2016 (21 pages).
R. Fielding et al., Internet Engineering Task Force (IETF), Request for Comments: 7231, Obsoletes: 2616, Updates: 2817, Category: Standards Track, ISSN: 2070-1721, Hypertext Transfer Protocol (HTTP/1.1): Semantics and Content, Jun. 2014 (102 pages).
R. Fielding et al., Internet Engineering Task Force (IETF), Request for Comments: 7232, Obsoletes: 2616, Category: Standards Track, ISSN: 2070-1721, Hypertext Transfer Protocol(HTTP/1.1): Conditional Requests, Jun. 2014 (29 pages).
R. Fielding et al., Internet Engineering Task Force (IETF), Request for Comments: 7233, Obsoletes: 2616, Category: Standards Track, ISSN: 2070-1721, Hypertext Transfer Protocol (HTTP/1.1): Range Requests, Jun. 2014 (26 pages).
R. Fielding et al., Internet Engineering Task Force (IETF), Request for Comments: 7234, Obsoletes: 2616,Category: Standards Track, ISSN: 2070-1721, Hypertext Transfer Protocol (HTTP/1.1): Caching, Jun. 2014 (44 pages).
R. Fielding et al., Internet Engineering Task Force (IETF), Request for Comments: 7235, Obsoletes: 2616, Updates: 2617, Category: Standards Track, ISSN: 2070-1721, Hypertext Transfer Protocol (HTTP/1.1): Authentication, Jun. 2014 (20 pages).
J. Reschke, Internet Engineering Task Force (IETF), Request for Comments: 7236, Category: Informational, ISSN: 2070-1721, Initial Hypertext Transfer Protocol (HTTP) Authentication Scheme Registrations Jun. 2014 (4 pages).
3GPP TS 23.161 V13.1.0, Technical Specification; 3rd Generation Partnership Project; Technical Specification Group Services and System Aspects; Network-Based IP Flow Mobility (NBIFOM); Stage 2 (Release 13) (Dec. 2015) (61 pages).
3GPP TS 23.261 V13.0.0, Technical Specification; 3rd Generation Partnership Project; Technical Specification Group Services and System Aspects; IP flow mobility and seamless Wireless Local Area Network (WLAN) offload; Stage 2 (Release 13) (Dec. 2015) (22 pages).
Fon, Building a WiFi community network since 2006, dated on or before Mar. 23, 2016 (8 pages).
IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, 2793 pages.
David C. Plummer, Network Working Group, Request for Comments: 826, An Ethernet Address Resolution Protocol—or—Converting Network Protocol Addresses to 48.bit Ethernet Address for Transmission on Ethernet—Hardware, Nov. 1982 (10 pages).
P. Mockapetris, Network Working Group, Request for Comments: 1034, Obsoletes: RFCs 882, 883, 973 Domain Names—Concepts and Facilities, Nov. 1987 (86 pages).
R. Droms, Network Working Group Request for Comments: 2131 Obsoletes: 1541, Category: Standards Track Dynamic Host Configuration Protocol, Mar. 1997 (71 pages).
J. Moy, Network Working Group, Request for Comments: 2178, Obsoletes: 1583, Category: Standards Track, OSPF Version 2, Jul. 1997(211 pages).
A. Huttunen, Network Working Group, Request for Comments: 3948, Category: Standards Track UDP Encapsulation of IPsec ESP Packets, Jan. 2005 (15 Pages).
S. Kent, Network Working Group, Request for Comments: 4301, Obsoletes: 2401 BBN Technologies, Category: Standards Track, Security Architecture for the Internet Protocol, Dec. 2005 (110 pages).
P. Eronen, Network Working Group, Request for Comments: 4555, Category: Standards Track, IKEv2 Mobility and Multihoming Protocol (MOBIKE) Jun. 2006 (52 pages).
C. Perkins, Network Working Group, Request for Comments: 4721, Obsoletes: 3012, Updates: 3344, Category: Standards Track, Mobile IPv4 Challenge/Response Extensions (Revised), Jan. 2007 (26 pages).
C. Perkins, Internet Engineering Task Force (IETF). Request for Comments: 6275, Obsoletes: 3775, Category: Standards Track, ISSN: 2070-1721, Mobility Support in IPv6, Jul. 2011 (169 pages).
A. Ford, Internet Engineering Task Force (IETF), Request for Comments: 6824, Category: Experimental, ISSN: 2070-1721, TCP Extensions for Multipath Operation with Multiple Addresses, Jan. 2013 (64 pages).
Wi-Fi Peer-to-Peer (P2P), Technical Specification, Version 1.5, Final Aug. 4, 2014 (183 pages).
IEEE P802.11-REVmcTM/D5.0, Jan. 2016, Draft Standard for Information technology—Telecommunications and information exchange between systems, Local and metropolitan area networks—Specific requirements, Part 11: Wireless LAN Medium Access Control (MAC) and Physical Layer (PHY) Specifications (134 pages).
Canadian Intellectual Property Office, International Search Report and Written Opinion dated Aug. 25, 2017 (8 pages).
Zhanikeev, Virtual Wireless User: A Practical Design for Parallel MultiConnect Using WiFi Direct in Group Communication, International Conference on Mobile and Ubiquitous Systems: Computing, Networking, and Services, 2013 (12 pages).

\* cited by examiner

USING WLAN CONNECTIVITY OF A WIRELESS DEVICE

BACKGROUND

A wireless device can communicate over a wireless network with another endpoint. Traditionally, a wireless device establishes a wireless link with an access point (AP) in the wireless network. The AP can have connectivity to a wide area network (WAN) such as the Internet. Thus, a wireless device is able to communicate over the WAN through the AP.

BRIEF DESCRIPTION OF THE DRAWINGS

Some implementations are described with respect to the following figures.

DETAILED DESCRIPTION

Figure 1:
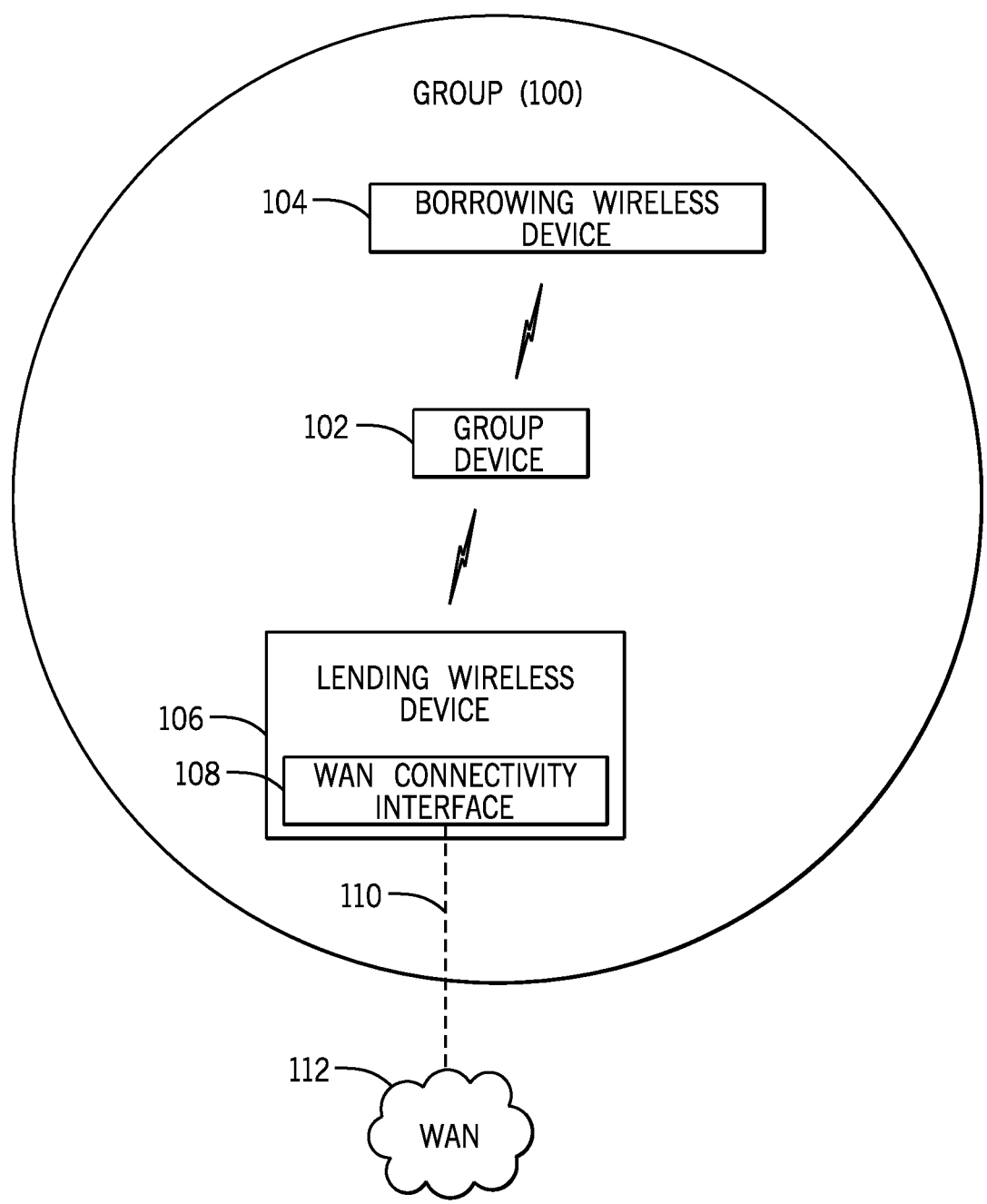
FIG. 1 is a block diagram of an example network arrangement according to some implementations.

A "wireless device" can refer to any type of electronic device that uses wireless communications. As examples, a wireless device can include any of the following: a portable computer, a smart phone, a tablet computer, a game appliance, a personal digital assistant (PDA), a wearable device (e.g. a smart watch, smart eyeglasses, etc.), a desktop computer, a vehicle (or an electronic device in a vehicle), a health monitor, and so forth.

Wireless communications can occur in a wireless network, such as a wireless local area network (WLAN) according to the Institute of Electrical and Electronics Engineers (IEEE) 802.11 protocols. Wireless communications according to IEEE 802.11 are also referred to as Wi-Fi wireless communications. Traditionally, within a WLAN, wireless devices are able to establish wireless links with one or more access points (APs). According to the IEEE 802.11 terminology, an access point can be referred to as an AP STA (short for "station"). Wireless devices, such as user devices or other types of devices, that communicate using the AP can be referred to as a non-AP STA.

In other examples, Wi-Fi Direct can be used to perform wireless peer-to-peer (P2P) communications. Wi-Fi Direct is a mechanism for a peer-to-peer network built on top of the IEEE 802.11 WLAN protocols, also referred to as Wi-Fi Peer to Peer (P2P). Wi-Fi Direct is specified by standards provided by the Wi-Fi Alliance (WFA). An arrangement of wireless devices that are able to communicate according to Wi-Fi Direct includes a P2P Group Owner (GO) device and P2P client devices. The GO device provides routing and packet forwarding functionality similar to that of an AP, while the client devices operate as non-AP STAs. Wi-Fi Direct procedures differ from regular IEEE 802.11/Wi-Fi procedures in how they perform discovery and group formation. Once a Wi-Fi Direct group has been formed and is operating, the routing and packet forwarding between devices in the group is similar to that of an IEEE 802.11 WLAN in which a traditional AP is used.

The Wi-Fi Direct arrangement includes a star network architecture in which the GO device is at the center of the star and interconnects other client devices of the Wi-Fi Direct group. The client devices of the Wi-Fi Direct group form the points of the star, and traffic between Wi-Fi Direct client devices are routed through the GO device.

Although reference is made to a Wi-Fi Direct group in some examples, it is noted that more generally, techniques or mechanisms according to some implementations of the present disclosure are applicable to other groups of wireless devices in which a group device is used to interconnect other wireless devices in the group in a star network architecture. A "group device" can refer to a wireless device in the group through which data is routed from a first wireless device of the group to another wireless device of the group.

Some wireless devices in the group may not have connectivity to a wide area network (WAN). A WAN can refer to any network that is external of a group of wireless devices. In some examples, the group of wireless devices can be form a local area network (LAN) or can be part of a LAN. A network that is external of the LAN can be referred to as the WAN. An example of a WAN is a public network such as the Internet.

In some examples, at least one wireless device in a group of wireless devices may include multiple wireless interfaces. A first wireless interface of the wireless device can be used to perform wireless communications with other members of the group of wireless devices. For example, this first wireless interface can be used for performing Wi-Fi communications. The wireless device can also include a second wireless interface that is used to connect to another wireless network, such as a cellular network. A wireless device that includes this second wireless interface, such as a cellular network interface, can use the second wireless interface to connect to a WAN.

In some examples, at least one wireless device of the group of wireless devices may not have wireless connectivity to a WAN. In some cases, such a wireless device without WAN connectivity can include a wireless device that is without a second wireless interface such as the cellular network interface—in other words, this wireless device includes a wireless interface to perform Wi-Fi communications, but no wireless interface to communicate to a wide area network. In other cases, a wireless device without WAN connectivity can include a second wireless interface such as a cellular network interface, but the wireless device is temporarily out of coverage of the network which provides the connectivity into the WAN.

To address the issue of a group of wireless devices that includes at least one wireless device that is without WAN connectivity, techniques or mechanisms are provided in which a lending wireless device (or multiple lending wireless devices) are able to lend its (their) WAN connectivity to the wireless device without WAN connectivity. A wireless device without WAN connectivity that borrows the WAN connectivity of a lending wireless device is referred to as a borrowing wireless device.

In examples where the group of wireless devices is a Wi-Fi Direct group of wireless devices, Wi-Fi Direct client devices, in addition to the Wi-Fi Direct GO device, are able to share their WAN connectivity with other wireless devices in the Wi-Fi Direct group.

In the ensuing discussion, reference is made to a group of wireless devices that include a borrowing wireless device, a lending wireless device, and a group device. It is noted that one physical device can serve multiple roles; for example, a single physical device can serve the roles of a borrowing wireless device and a group device, or alternatively, can serve the roles of a lending wireless device and a group device. Thus, reference to a borrowing wireless device, a lending wireless device, and a group device can include a reference to separate physical devices that perform the respective borrowing, lending, and group roles, or alternatively can include a reference to physical devices where at least one physical device serves multiple roles.

1. Issues

Various issues can be associated with the sharing of WAN connectivity of a lending wireless device by a borrowing wireless device. The following are examples of some issues.

Issue 1: Providing permission by wireless devices having WAN connectivity for allowing other wireless devices of a group of wireless devices to borrow the WAN connectivity.

Issue 2: Routing data of a borrowing wireless device using the WAN connectivity of a lending wireless device of the group of wireless devices.

Issue 3: Using multiple WAN connectivities of lending wireless devices in the group of wireless devices by a borrowing wireless device.

Issue 4: Authenticating and authorizing a borrowing wireless device to share the WAN connectivity of a lending wireless device.

Issue 5: Changing lending wireless devices that provide WAN connectivity to a borrowing wireless device. The changing of the WAN connectivity can result in a network address, such as an Internet Protocol (IP) address of a client changing, as seen by an application server or security gateway in the WAN. Change of an IP address mid-session can create problems for some types of applications.

2. General Solution

FIG. 1 is a block diagram of an example network arrangement that includes a group 100 of wireless devices. The group 100 of wireless devices in some examples can be a Wi-Fi Direct group. In other examples, the group 100 can include a different type of group of wireless devices. The wireless devices in the group 100 includes a group device 102 that interconnects other wireless devices, including a borrowing wireless device 104 and a lending wireless device 106. In examples where the group 100 of wireless devices is a Wi-Fi Direct group, the group device 102 is a GO device, and the wireless devices 104 and 106 are P2P client devices. Although just one borrowing wireless device 104 and one lending wireless device 106 are shown in FIG. 1, it is noted that the group 100 can include multiple borrowing wireless devices and/or multiple lending wireless devices in other examples.

The group device 102 communicates wirelessly with the borrowing wireless device 104 and the lending wireless device 106. The lending wireless device 106 has a wireless interface 108 that provides wireless connectivity 110 to a WAN 112. The wireless interface 108 can be referred to as a WAN connectivity interface.

The lending wireless device 106 is able to lend its WAN connectivity to another wireless device in the group 100, such as the borrowing wireless device 104. Note that the borrowing wireless device 104 can borrow the WAN connectivity of multiple lending wireless devices, in further examples. In such cases, the aggregate throughput of the multiple lending devices can be used by the borrowing wireless device 104 to increase data communication rates by the borrowing wireless device 104. Moreover, the ability to borrow the WAN connectivity of multiple lending wireless devices can improve robustness, resilience, and availability, since the borrowing wireless device 104 can continue to use the WAN connectivity of an operational lending wireless device if another wireless device becomes non-functional or otherwise is unable to lend its WAN connectivity.

An arrangement in which at least one wireless device without WAN connectivity is able to borrow the WAN connectivity of another wireless device can be referred to as a "distributed hotspot." More generally, a first wireless device is able to use the WAN connectivity of a second wireless device.

Figure 2:
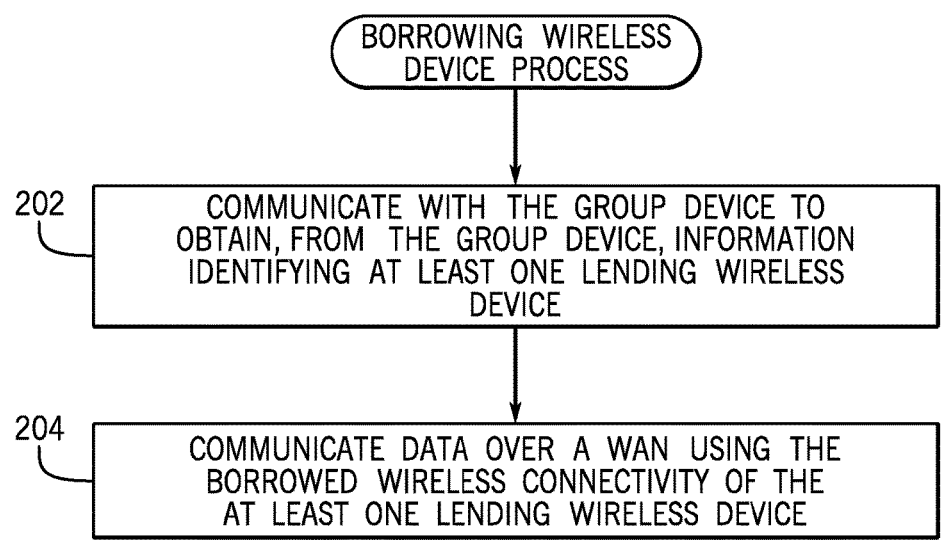
FIG. 2 is a flow diagram of an example process of a borrowing wireless device, according to some implementations.

FIG. 2 is a flow diagram of an example process that can be performed by the borrowing wireless device 104 according to some examples. According to FIG. 2, the borrowing wireless device 104 communicates (at 202) with the group device 102, to obtain, from the group device 102, information identifying at least one lending wireless device (e.g. the lending wireless device 106) from which the borrowing wireless device is able to borrow a wireless connectivity of the at least one lending wireless device to a WAN (e.g. WAN 112).

The borrowing wireless device 104 also communicates (at 204) data over the WAN 112 using the borrowed wireless connectivity of the at least one lending wireless device (e.g. the lending wireless device 106).

3. Using an Application Layer to Configure and Manage the Lending of WAN Connectivity Solutions according to some examples described in this section can be used to address Issue 1 discussed above. Such solutions involve the use of code at an application layer of a wireless device to configure and manage the lending of WAN connectivity. Code at an application layer can be referred to as an application. An application layer is a layer in a wireless device above the communication protocol layers of a communication protocol stack in the wireless device, where the communication protocol layers are used to perform communications over a network. A communication protocol stack that can include some combination of the following layers, as examples: a Transmission Control Protocol (TCP) layer, a User Datagram Protocol (UDP) layer, an IP layer, a MAC layer, and so forth.

The group device 102 can host a distributed hotspot application server, such as a Hypertext Transfer Protocol (HTTP) server or web server. HTTP is an application protocol that can be used to establish a session (referred to as an HTTP session) through which messages, referred to as HTTP messages, can be exchanged between devices to perform communications between the devices. HTTP is described by Request for Comments (RFC) 7230-7237. Although reference is made to an HTTP server in some examples, it is noted that in other examples, other application layers can be used in the group device 102 to manage the borrowing and lending of WAN connectivity within a group of wireless devices.

A distributed hotspot application in a wireless device, such as the lending wireless device 106, is used by the user of the wireless device to configure permissions for sharing the wireless device's WAN connectivity among other members of the group 100. Information relating to the sharing permissions configured using the distributed hotspot application is provided to the distributed hotspot application server at the group device 102, and this sharing permissions information can be used to achieve a target forwarding or routing of data units (in the form of frames or packets) between the lending wireless device and the borrowing wireless device (such as by using techniques described in Section 4, 5, or 6 discussed further below). The forwarding or routing of data units can include layer 2 (L2) forwarding, such as by use of Medium Access Control (MAC) addresses. Alternatively, the forwarding or routing of data units can include layer 3 (L3) routing, such as by use of Internet Protocol (IP) addresses.

In the ensuing discussion, reference is made to a Wi-Fi Direct group and wireless devices of such a Wi-Fi Direct group. It is noted that the techniques or mechanisms below can also be applied to other types of groups of wireless devices.

As noted above, by using a distributed hotspot application, a wireless device of a Wi-Fi Direct group can indicate its willingness to share or lend its WAN connectivity with other wireless devices of the group. Similarly, using a distributed hotspot application, a wireless device of the Wi-Fi Direct group can indicate a desire to borrow WAN connectivity from other wireless devices of the group. Such indications from the distributed hotspot applications at the borrowing and lending wireless devices are stored as information at the distributed hotspot application server in the group device 102.

Procedure 1

Figure 3:
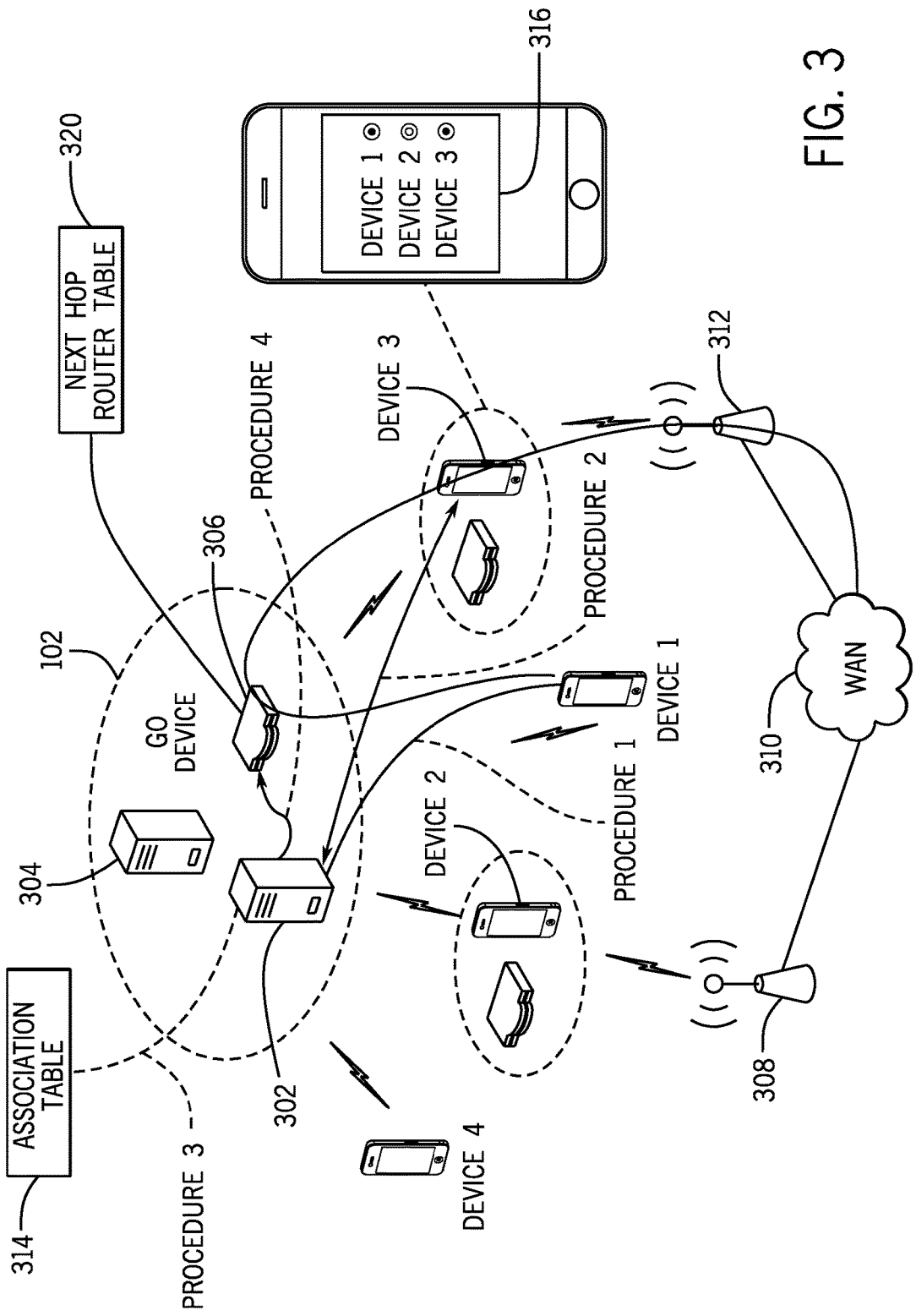
FIGS. 3 and 4 are block diagrams of example network arrangements that includes a group of wireless devices according to further implementations.

The following describes Procedure 1, in connection with an example network arrangement as shown in FIG. 3, used by a borrowing wireless device (e.g. Device 1), that wants to utilize another wireless device's WAN connectivity (e.g. Device 2 or Device 3). As shown in FIG. 3, Device 2 has WAN connectivity to a WAN 310 through a wireless access network node 308 (e.g. a cellular access network node), while Device 3 has WAN connectivity to the WAN 310 through a wireless access network node 312 (e.g. a cellular access network node).

As further shown in the example of FIG. 3, the GO device 102 includes an HTTP server 302, a Dynamic Host Configuration Protocol (DHCP) server 304, and an IP router 306. DHCP is a network protocol used on IP networks for dynamically distributing network configuration parameters, such as IP addresses for interfaces and services.

Although reference is made to an "IP router" 306, it is noted that the node 306 can act as a layer 2 switch when directing traffic based on layer 2 MAC information, and can act as a layer 3 router when directing traffic based on IP (layer 3) information.

Procedure 1 in FIG. 3 refers to a procedure performed by a borrowing wireless device, which in FIG. 3 is Device 1. It is assumed that a distributed hotspot application (e.g. an HTTP application) is installed on Device 1, which wishes to borrow the WAN connectivity of another wireless device.

Once Device 1 has been allocated an IP address in the Wi-Fi Direct group, as part of normal Wi-Fi Direct group joining procedures, Device 1 can access the HTTP server 302 that is hosted on the GO device 102. The IP address of the HTTP server 302 can be discovered by Device 1 using any of the following.

Device 1 can send a Domain Name System (DNS) query that includes a domain name of the HTTP server, where the domain name can be a fully qualified domain name (FQDN) specified by a standard or by some other source. The DNS query can be sent to a DNS server of the GO device 102. The DNS server can respond to the DNS query with the IP address of the HTTP server 302. DNS is a hierarchical distributed naming system. A key capability of DNS is that it provides for the translation of more readily memorized domain names (text strings) to the numerical IP addresses.

Device 1 can use an IP address of the HTTP server 302 that is specified in the Wi-Fi Direct standard or another source.

Device 1 can obtain the IP address of the HTTP server 302 using a DHCP exchange with the DHCP server 304 of the GO device 102.

The IP address of the HTTP server 302 can be dynamically provided by the GO device 102 to Device 1 as an enhancement to existing Wi-Fi Direct group formation procedures.

The HTTP server 302, which is an example of a distributed hotspot application server, presents Device 1 with the following options.

According to option 1, the HTTP server 302 can provide information that is useable by Device 1 to display a graphical user interface (GUI), such as in a web page, where the GUI includes a GUI button or other control element or input field to enable a user at Device 1 to indicate if the user wants to borrow any available WAN connectivity. For example, if the user activates the GUI button or other control element, or enters a command or other information into an input field, then an indication is provided to the HTTP server 302 that Device 1 is requesting the borrowing of the WAN connectivity of another wireless device. With option 1, activation of the GUI button or other indication in the GUI is an indication that Device 1 can borrow the WAN connectivity of any one or more lending wireless devices in the group.

According to option 2, a GUI at Device 1 can display identifiers of either all wireless devices in the Wi-Fi Direct group with WAN connectivity, or just specific wireless devices in the Wi-Fi Direct group that have indicated a willingness and/or ability to share a WAN connectivity, or both. A user at Device 1 can select the wireless devices presented in the GUI that the user is willing to borrow WAN connectivity from.

With either option 1 or 2, Device 1 can also indicate (such as with a control element or input field in a GUI) whether Device 1 can make use of multiple WAN connections (and if so, how many of such WAN connections). Such indications provided through the GUI presented by the HTTP application at Device 1 can be received by the HTTP server 302 and stored.

Procedure 2

The following describes Procedure 2 that is performed by a lending wireless device (Device 3 in FIG. 3) that can grant permission for one or more borrowing wireless devices to use the lending wireless device's WAN connectivity.

It is assumed that a distributed hotspot application (e.g. an HTTP application) is installed on Device 3. It is assumed that a user (e.g. owner of Device 3) is prepared to lend Device 3's WAN connectivity to other wireless devices.

Device 3 obtains an IP address from the Wi-Fi Direct group and can access the HTTP server as described above for Procedure 1.

The HTTP server 302 in the GO device 102 can provide one of the following options to Device 3.

According to option 1, a GUI can be presented by Device 3 (based on information from the GO device 102), and a user of Device 3 can use the GUI to indicate that Device 3 is prepared to share its WAN connectivity with any member of the Wi-Fi Direct group. For example, the user of Device 3 can activate a control element or enter information into an input field in the GUI to indicate the willingness to share Device 3' WAN connectivity with any member of the Wi-Fi Direct group.

According to option 2, a GUI (e.g. GUI 316) can be presented by Device 3 (based on information from the GO device 102) to display a list of wireless devices with which Device 3 could share its WAN connection. The user of Device 3 can select, in the GUI, which of the listed wireless devices with which Device 3 is prepared to share its connectivity.

Such selections provided through the GUI presented by the HTTP application at Device 3 can be received by the HTTP server 302 and stored.

Procedure 3

The following Procedure 3 in FIG. 3 that can be performed by the GO device 102 to bind borrowing wireless device(s) in the Wi-Fi Direct group with lending wireless device(s) in the Wi-Fi Direct group. The binding can produce an association table 314 that can list, for each given borrowing wireless device in the Wi-Fi Direct group shown in FIG. 3, which lending wireless device(s) has (have) been selected for the given wireless device. In some examples, the table 314 can also identify the wireless devices with direct WAN connectivity to the WAN 310.

Procedure 3 can be run any time there is a change in borrowing requirements and lending permissions, such as in response to a wireless device indicating that the wireless device wishes to borrow (or stop borrowing) the WAN connectivity of a lending wireless device (using Procedure 1 above), or in response to a wireless device indicating that the wireless device is able to (or no longer able to) lend its WAN connectivity (using Procedure 2 above).

The distributed hotspot application server (e.g. HTTP server 302) in the GO device 102 determines which of the available lending wireless devices will be used to serve a particular borrowing wireless device. If there are multiple lending wireless devices available to lend their WAN connectivity to the particular borrowing wireless device, then any one of the following example techniques can be used for deciding which lending wireless device(s) will be selected.

1) If a borrowing wireless device can make use of the WAN connections of all available lending wireless devices, then the distributed hotspot application in the GO device 102 can grant permission to use the WAN connections of all available lending wireless devices.
2) If the number of available lending wireless devices is greater than the number of WAN connections that the borrowing wireless device can use, then the selection of lending wireless devices performed by the distributed hotspot application in the GO device 102 may include selecting the higher ranked lending wireless devices, where the ranking may be according to any one or more of: (a) the number of borrowing wireless devices already associated with each lending wireless device, where the fewer the number of borrowing wireless devices the higher the ranking, (b) user preference, where the user of the borrowing wireless device can indicate relative preference levels for different lending wireless devices (which can be entered into a GUI at the borrowing wireless device, for example), or (c) any other factor.

Procedure 4

The following describes Procedure 4 performed by the GO device 102 to provide a configuration for L2 or L3 forwarding or routing.

To pair lending wireless device(s) and borrowing wireless device(s) that have been bound using Procedure 3, operations as described in Sections 4, 5, and 6 below can be employed.

Other Procedures and Enhancements

The following describes other procedures and enhancements.

A lending wireless device can use the HTTP application to indicate that the lending wireless device no longer has WAN connectivity, or the lending device no longer wishes to lend its WAN connectivity. The lending wireless device in some examples can specify which borrowing wireless devices are barred from using the WAN connectivity of the wireless lending device.

A lending wireless device can place usage caps on each wireless borrowing device. A borrowing wireless device may be notified of any usage caps using the HTTP application. The monitoring of the usage of the WAN connectivity of the lending wireless device can be performed either by the lending wireless device itself or by the GO device. Usage caps can be specified in terms of the maximum number of bytes (or other counts of the amount of data) transferred or maximum throughput allowed. If usage monitoring is being carried out in the lending wireless device, then the lending wireless device can notify the distributed hotspot application server (e.g. the HTTP server 302) in the GO device 102 that the usage cap had been met.

Usage policing, which includes monitoring usage of the WAN connectivity of the lending wireless device and determining whether the usage exceeds the usage cap, can be performed at the lending wireless device or the GO device 102.

A notification of the termination of a route between the borrowing wireless device and lending wireless device due to exceeding a usage cap can be sent by the GO device 102 to the user of the borrowing wireless device via the HTTP application of the borrowing wireless device.

In further examples, an additional procedure can be used to enable a borrowing wireless device to indicate that the borrowing wireless device no longer wishes to borrow the WAN connectivity of a specific lending wireless device or multiple (e.g. all) lending wireless devices.

4. Use Application Layer Information to Configure MAC Layer Forwarding Between Borrowing and Lending Wireless Devices Solutions described in this section can be used to address Issue 2 discussed above. The following provides an example of Procedure 4 depicted in FIG. 3 for providing a configuration to perform forwarding of frames using MAC.

The borrowing wireless device is informed of (or learns) the lending wireless device's Ethernet MAC address. In addition, in order that the borrowing wireless device can distinguish WAN bound traffic from LAN traffic, the borrowing wireless device can also be informed of the IP address range used on the LAN—this IP address range includes an IP address, or a range of IP addresses, of destination devices on the LAN. The foregoing information (including the lending wireless device's MAC address and the IP address range of the LAN) can be conveyed to the borrowing wireless device either directly or indirectly.

The information can be directly provided by the GO device 102 to the borrowing wireless device using the distributed hotspot application (e.g. at HTTP level between the HTTP server 302 at the GO device 102 and the HTTP application in the borrowing wireless device).

Alternatively, the information can be indirectly provided to the borrowing wireless device in one of the following example ways.

The HTTP server 302 in the GO device 102 notifies the borrowing wireless device only that a new lending wireless device (a gateway to a WAN) is available. In response, the borrowing wireless device sends a DHCPINFORM message (according to DHCP) to the GO device 102, and the DHCP server 304 in the GO device 102 responds by determining the identity of the borrowing wireless device. The DHCP server 304 then responds to the DHCPINFORM message with a DHCPACK message sent to the borrowing wireless device. The DHCPACK message can include the IP address of the lending wireless device and also the IP address range of the LAN.

In another example of an indirect way of sending the information to the borrowing wireless device, the borrowing wireless device can use the IP address of the lending wireless device in an exchange according to the Address Resolution Protocol (ARP) to determine the MAC address of the lending wireless device. ARP is a protocol used for resolution of network layer (IP) addresses into link layer (Ethernet MAC) addresses.

Once the borrowing wireless device has obtained the MAC address of the lending wireless device, L2 forwarding of packets using MAC addresses can be performed.

Packet Originated by the Borrowing Wireless Device

The following describes routing of packets originated by the borrowing wireless device.

The borrowing wireless device uses the MAC address of the lending wireless device as the destination MAC address whenever the borrowing wireless device sends an IP packet that is destined for the WAN 310.

Conversely, when sending a packet destined for an IP address on the LAN, the borrowing wireless device sets the 802.11 MAC Destination Address to be that corresponding to the destination IP address (where the device can learn the MAC address corresponding to the destination IP address using ARP), while the 802.11 MAC Receiver Address is set to be that of the AP.

Assuming that the packet sent by the borrowing wireless device includes the destination MAC address of the lending wireless device, the node 306 (acting as a layer 2 switch) in the GO device 102 forwards the packet to the lending wireless device.

Upon receiving a packet from the GO device 102, the lending wireless device inspects the destination IP address of the received packet from the GO device 102 to determine whether the received packet is to be forwarded onto the WAN 310, or whether the packet terminates at the lending wireless device itself.

Packet to be Terminated at Borrowing Wireless Device

The following describes routing of packets to be terminated at the borrowing wireless device.

The lending wireless device receives a packet from the WAN 310. The lending wireless device may in some examples include a network address translator (NAT) to apply network address translation on the destination IP address included in the received packet. Network address translation works by mapping an IP address and port number to an IP address and a new UDP/TCP port number (mapping of IP addresses and ports is known as NAT-PT—NAT with Port Translation).

The lending wireless device uses ARP and the translated destination IP address to determine the 802.11 MAC Destination Address of the borrowing wireless device. The lending wireless device then builds an 802.11 MAC packet data unit (PDU) with the MAC destination address set to that of the borrowing wireless device. The MAC source address of the MAC PDU is set to that of the lending wireless device, and the MAC receiver address of the MAC PDU is set to the MAC address of the AP (which in FIG. 3 is the GO device 102).

The foregoing assumes that the borrowing wireless device is using the WAN connectivity of a single lending wireless device.

Also, the above solution is described completely in terms of L2 forwarding, as the IP routing functionality available at the GO device 102 is not utilized.

5. Using Application Layer Information to Configure IP/IPsec Tunneling Between Borrowing and Lending Wireless Devices Solutions described in this section can be used to address Issues 2 and 4 discussed above.

Solution to Address Issue 2

To address Issue 2, the following solution can be employed.

This solution is similar to the solutions described in Section 4, but with the difference that an IP or IPsec (IP Security) level tunnel is established between the borrowing wireless device and lending wireless device.

IP tunneling is a technique by which an IP packet that is generated by or arrives at IP routing network node A can be forced to arrive at IP routing network node B. This is achieved through a process of encapsulation in which the original IP packet (IPo) is encapsulated within (carried by) another IP packet (IPe). The destination IP address of IPe (the outer IP packet) is set to be the destination IP address of the end of the tunnel, i.e. the IP address of IP routing network node B in the above example.

Multiple tunneling techniques are available, such as the IPsec technique. With IPsec, in addition to performing the above described tunneling, the payload traffic (IPo) that is carried within the encapsulating packet is encrypted to avoid eavesdropping. In the case of IPsec, because encryption is performed, both tunnel endpoints have to authenticate and authorize one another. This authentication and authorization and the setup of the tunnel can be achieved using Internet Key Exchange, version 2 (IKEv2).

The borrowing wireless device is informed by the GO device 102 of the IP address of an available lending wireless device either directly or indirectly.

The borrowing wireless device can be informed of the IP address of the lending wireless device directly using the HTTP application in the borrowing wireless device.

Alternatively, the borrowing wireless device can indirectly obtain the IP address of the lending wireless device as follows. The borrowing wireless device can be informed by the HTTP application of some text label corresponding to the lending wireless device (e.g. a text string corresponding to a device name). The borrowing wireless device uses this text string to build an FQDN after which the borrowing wireless device performs a DNS lookup (with the GO device 102 that includes a DNS server) to determine the IP address of the lending wireless device.

The borrowing wireless device uses the IP address of the lending wireless device to build an IP or IPsec tunnel to the lending wireless device, such as by using Internet Key Exchange, version 2, in some examples.

The following describes packet forwarding for IP packets originating from the borrowing wireless device or to be terminated at the borrowing wireless device.

IP Packets Originating from the Borrowing Wireless Device

The borrowing wireless device first makes a determination as to whether an IP packet is destined for the LAN or for the WAN. The borrowing wireless device may have been informed of the IP address range on the LAN using DHCP. Alternatively there may be some other configuration data associated with applications in the borrowing wireless device that inform the borrowing wireless device of whether an application server or other target endpoint will only be available on the WAN instead of the LAN.

If the packet is destined for the WAN, then the borrowing wireless device includes a destination IP address corresponding to the WAN in the packet. The packet including the destination IP address corresponding to the WAN can be transported through the IP/IPsec tunnel as follows.

The source IP address (as populated by the borrowing wireless device) in the packet for both the inner IP header and outer IP header can be the same and is that which had been assigned to the device by the GO device. The destination IP address (as populated by the borrowing wireless device) for the outer (tunnel) IP header is set to the IP address of the lending wireless device. The destination IP address of the inner IP header is set to that of the internet application server.

The WAN connectivity borrowing device sets the destination MAC address in the packet to be that of the GO device 102. Note that the IP router 306 in the GO device 102 routes using the destination IP address only (as is usual for a router).

A packet that contains a destination IP address corresponding to the LAN is not carried in the IP or IPsec tunnel, but rather is carried in the regular Wi-Fi Direct manner.

IP Packets Terminating at the Borrowing Wireless Device

The lending wireless device receives a packet from the WAN 310. The lending wireless device inspects the destination IP address of the packet received from the WAN 310.

If the destination IP address (after any network address translation) corresponds to that of the borrowing wireless device with which the lending wireless device has an IP or IPsec tunnel established, then the lending wireless device encapsulates the received packet in the IP/IPsec tunnel (the outer IP header destination IP address is set to be the IP address of the borrowing wireless device, the outer IP header source address is set to the IP address of the lending wireless device). The lending wireless device sets the destination MAC address in the packet to be that of the GO device 102 (where the routing at the IP layer occurs).

If the destination IP address (after any network address translation) of the received packet does not correspond to that of the borrowing wireless device with which the lending wireless device has an IP or IPsec tunnel established, the packet is forwarded to the router 306 in the GO device 102 by setting the destination MAC address of the packet to the address of the router 306 in the GO device 102.

The above solution is described for the case where a borrowing wireless device makes use of a single lending wireless device.

Also, the above solution is described in terms of L3 IP level tunnel based routing via the IP router 306 in the GO device.

Solution to Address Issue 4

The following describes a solution to address Issue 4.

Figure 4:
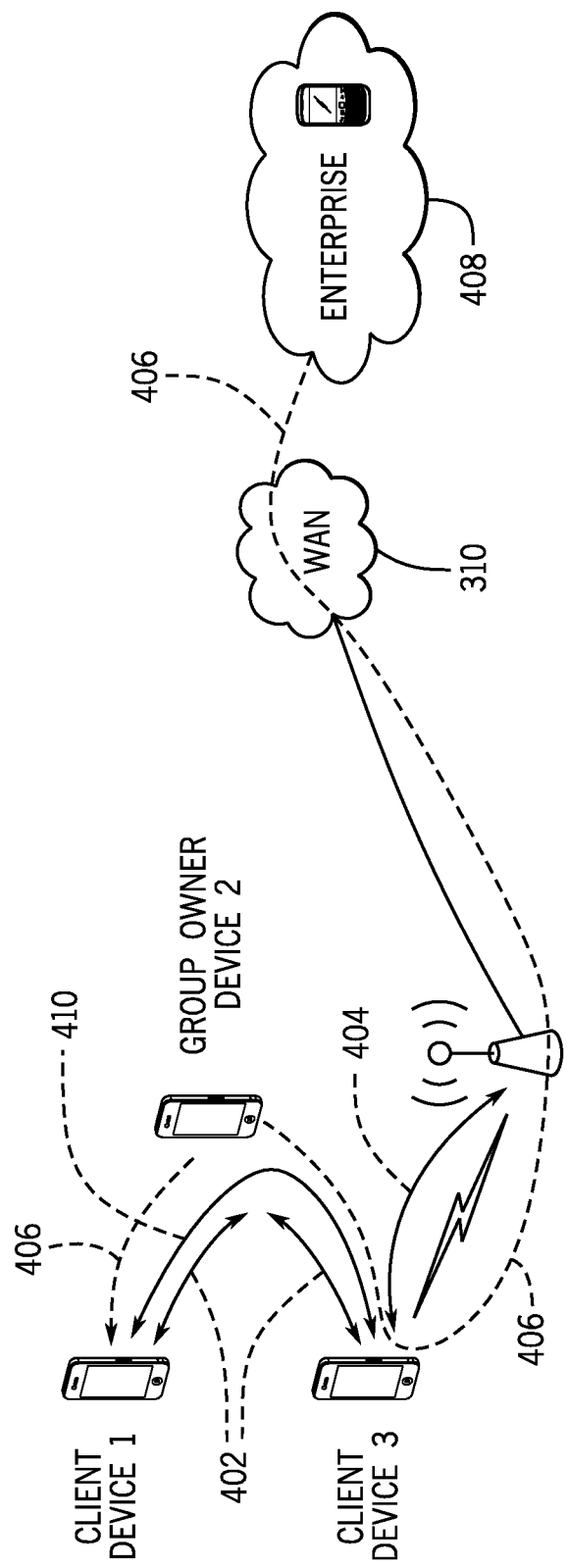

Several security mechanisms can be used, such as in the example network arrangement of FIG. 4. With a first security mechanism 402, wireless devices wishing to join a Wi-Fi Direct group will have been authenticated or authorized to do so by the GO device 102 (e.g. using Wi-Fi Protected Setup (WPS)/push button). Encryption keys are provided during group formation for encrypting the links between wireless devices and the GO device 102.

With a second security mechanism 404, a cellular WAN connected device or other wireless device with WAN connectivity will have been authenticated or authorized by the cellular network (or other suitable network) and will apply encryption over the cellular radio link.

With a third security mechanism 406, a wireless device may build a virtual private network (VPN) into its enterprise 408 if the wireless device does not trust all members of the Wi-Fi Direct group through which its information is being passed.

In accordance with some implementations of the present disclosure, another security mechanism 410 involves a lending wireless device (e.g. Device 3 in FIG. 4) ensuring that only members of the Wi-Fi Direct group whom the lending wireless device has authorized and authenticated can make use of the WAN connectivity of the lending wireless device. This other security mechanism can employ the following procedure.

The borrowing wireless device establishes an IPsec tunnel with the lending wireless device. Credentials used to establish the IPsec tunnel may be agreed to according to any of a number of techniques. For example, the user of the lending wireless device can share in an out of band manner (e.g. verbally) a password with the user of the borrowing wireless device who then types the password into a GUI presented by the distributed hotspot application running on the borrowing wireless device.

The user of the lending wireless device may also be asked to type in the password into the GUI of the distributed hotspot application running in the lending wireless device.

Alternatively, a preconfigured or randomly generated password or passcode (e.g. a PIN) can be used, in which case the user of the lending wireless device would not have to enter a password or passcode into a GUI at the lending wireless device.

Note that the assumption here is that any wireless device in the Wi-Fi Direct group can contact any other device in the Wi-Fi Direct group at the IP layer via the IP router in the GO device 102.

For the transmission of a packet originating from the borrowing wireless device, where the packet is destined to the WAN 310, the lending wireless device checks the integrity protection information in the IPsec tunnel to ensure that only devices which the lending wireless device has authorized or authenticated are utilizing its shared WAN connectivity. After stripping off the outer IP header (as part of the tunnel termination), if the destination IP address is in the WAN 310, then the lending wireless device forwards the packet to the WAN 310.

For the transmission of a packet received from the WAN 310 and terminating at the borrowing wireless device, if the destination IP address in the received packet is that of the borrowing wireless device, then the packet is encapsulated in an IPsec tunnel (i.e. the outer IP address and the IPsec header are added), and then the IP packet is forwarded to the GO device 102, which routes the packet to the borrowing wireless device. The borrowing wireless device may check the integrity of the received packet and if the integrity test passes, the borrowing wireless device strips off the outer IP header (as part of the tunnel termination) and passes the inner IP packet up to higher layers.

Note that in the event that the GO device 102 itself is providing the WAN connection, then the additional IPsec tunnel is not used, and the GO device 102 can rely on existing Wi-Fi Direct authentication/authorization and encryption.

6. Using Application Layer Information to Configure Source IP Address Based Routing Between Borrowing and Lending Wireless Devices The solutions described in this section can be used to address Issue 2.

This solution is similar to solutions described in Section 4, with the difference being that routing or forwarding of packets is performed at the IP level through the configuration of a next-hop-router table 320 (as shown in FIG. 3) in the IP router 306 in the GO device 102. However, unlike a conventional IP router, for the case of sending a packet from the borrowing device towards the WAN, the IP router 306 in the GO device 102 considers both the destination IP address (which is normal) and the source IP address (which is not normal) of a packet. Specifically, if the destination IP address is an IP address within the LAN's IP address range, then the router 306 in the GO device 102 forwards the IP packet in the conventional manner for a Wi-Fi Direct network based on the destination IP address. However if the destination IP address corresponds to an IP address outside of the LAN (i.e. an IP address on the WAN), then the router 306 in the GO device 102 uses the source IP address to perform a lookup, using the next-hop-router table 320, of the next hop router (which would be a lending wireless device). The mapping of a next hop IP router (IP address of a lending wireless device) and a particular source IP address (borrowing wireless device) is obtained using the information that was provided in the HTTP application.

Using the information provided in the HTTP server 302, the routing table 320 in the GO device 102 can be updated as follows, in some examples:

Source IP address A (of borrowing wireless device A) is mapped to next hop router IP address P (of lending wireless device P), and Source IP address B (of borrowing wireless device B) is mapped to next hop router IP address Q (of lending wireless device Q).

The following describes packet forwarding for IP packets originating from the borrowing wireless device or terminating at the borrowing wireless device.

IP Packets Originating from the Borrowing Wireless Device:

For an IP packet originating from a borrowing wireless device, the borrowing wireless device sends the IP packet to the IP router 306 in the GO device 102, by setting the destination MAC address in the packet equal to that of the IP router 306 in the GO device 102.

If the IP router 306 in the GO device 102 determines that the IP destination address is within the IP address range of the LAN, then the packet is routed toward the device on the LAN, as done in the regular manner for Wi-Fi Direct.

However, if the IP router 306 in the GO device 102 determines that the IP destination address corresponds to the WAN, then the IP router 306 inspects the next-hop-router table 320, and looks up the next hop router address based on the source IP address in the packet. The IP router 306 then forwards the packet to the appropriate lending wireless device, by setting the destination MAC address in the packet to that of the lending wireless device. The lending wireless device then inspects the destination IP address to determine whether the packet is to be terminated at the lending device itself or forwarded onto the WAN.

IP Packets Terminating at the Borrowing Wireless Device

The lending wireless device receives packets from the WAN 310, and forwards all packets received from the WAN 310 (that are not destined for the lending wireless device itself) downlink to the IP router 306 in the GO device. The IP router 306 then routes each packet to its destination based on the destination IP address in the packet, according to regular Wi-Fi Direct routing.

It is noted that the foregoing solutions address the case where a borrowing wireless device makes use of the WAN connectivity of a single lending wireless device.

General Notes Applying to the Solutions in Sections 4, 5, and 6

Note that the GO device 102 itself may have WAN connectivity and the user of the GO device 102 can configure sharing permissions in just the same way as described for the lending wireless devices above.

Note in principle it may be possible for the distributed hotspot HTTP server 302 to be hosted on a separate device from the GO device 102.

A wireless device having WAN connectivity can route any WAN bound traffic directly onto its WAN connection (and avoiding a trombone routing to the GO device 102 and back).

A mixture of the solutions in Sections 4, 5, and 6 can also be implemented. For example, one solution may be used for a packet originating on the borrowing wireless device, but another solution may be used for a packet which is to be terminated at a borrowing wireless device. Alternatively, different mechanisms may be mixed depending on whether packets are destined for the LAN or for the WAN.

7. Using Multipath TCP to Exploit Multiple WAN Connections

In some implementations, a borrowing wireless device of a Wi-Fi Direct group can use multiple WAN connections of multiple lending wireless devices of the Wi-Fi Direct group, based on support of multiple paths between the borrowing wireless device and the lending wireless devices. Different communications, such as different IP flows, can be carried over the multiple paths for improved throughput.

In some examples, to support such multiple paths between the borrowing wireless device and multiple lending wireless devices, Multipath TCP (MPTCP) can be used. With MPTCP, a single application flow is split over multiple TCP/IP links by using a Multipath TCP shim layer. In conventional MPTCP, different IP addresses are assigned on each link. The method enables the application to benefit from the increased aggregate throughput achievable over the multiple IP interfaces To use MPTCP in the Wi-Fi Direct distributed hotspot application, MPTCP is implemented in the borrowing wireless device as well as on an MPTCP application server (where this application server is typically hosted on the Internet, for example it could be an application server hosting a news web page).

Also, a mechanism is used both in the borrowing wireless device and in the (e.g. Internet hosted) application server for deciding how many packets to forward over each TCP/IP stack.

Figure 5:
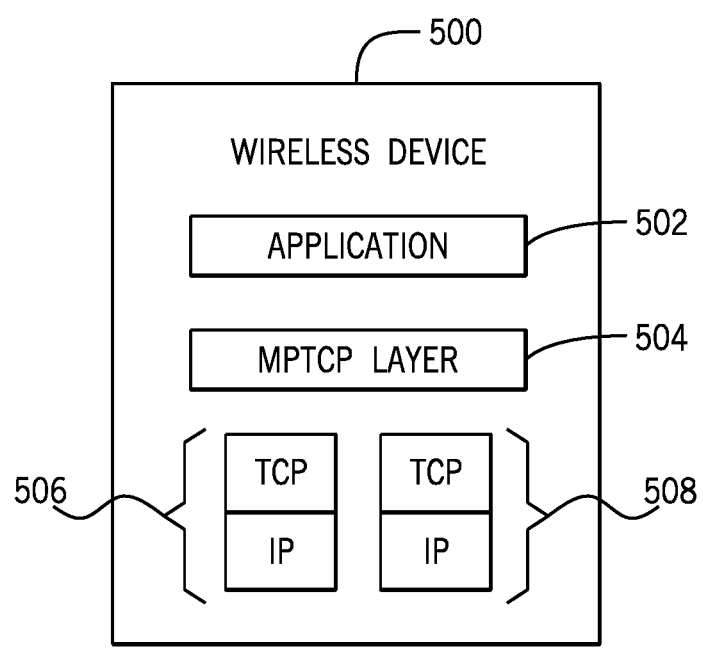
FIG. 5 is a block diagram of a wireless device according to some implementations.

FIG. 5 shows a wireless device 500 that includes an application 502, an MPTCP layer 504, and multiple protocol stacks 506 and 508. Each protocol stack includes multiple communication protocol layers, which in FIG. 5 includes a TCP layer and an IP layer. The wireless device 500 is a borrowing wireless device.

Three options can be used for how packets can be conveyed over the multiple WAN connections, when using MPTCP as described below.

Option 1: MPTCP with MAC Layer Forwarding

Device IP Address Management

With Option 1, MAC layer forwarding is used in conjunction with MPTCP. A wireless device is only allocated a single IP address by the GO device 102. Note that the GO device 102 can allocate multiple IP addresses, one for each TCP/IP stack underneath MPTCP (one for each lending wireless device), but this does not have to be performed.

Forwarding of Packets Originating in the Borrowing Wireless Device

The device MPTCP layer 504 selects the TCP/IP stack (of multiple TCP/IP stacks) to use to forward a packet. The source IP address in the packet is set to the source IP address allocated to the borrowing wireless device by the GO device 102 (the same source IP address is used by all TCP/IP stacks 506 and 508 underneath the MPTCP layer 504).

The Ethernet destination MAC address in the packet is set to the MAC address of the lending wireless device that is associated with the selected TCP/IP stack. The borrowing wireless device learns the MAC address of the lending wireless devices using techniques described in Section 4.

At the lending wireless device the IP packet is passed through a NAT. Since each TCP/IP stream (underneath the MPTCP layer 504) is communicated via a different lending wireless device, at the MPTCP application server packets from the multiple TCP/IP streams appear to be arriving from different source IP addresses.

Forwarding of Packets Terminating at the Borrowing Wireless Device

The MPTCP layer and the TCP/IP layers in the application server behave in similar manner as a typical MPTCP application server. Note that the MPTCP layer in the application server is designed to work over multiple IP interfaces (e.g. an MPTCP server will talk to a device which will typically have an IP address assigned by cellular and an IP address assigned by WLAN). However, in the solution described here, through the use of the NAT, the MPTCP application server sees multiple IP interfaces, even though on the borrowing wireless device there is only one IP address assigned.

In response to receiving an IP packet from the WAN, the lending wireless device performs network address translation, and uses ARP to learn the Ethernet MAC address of the borrowing wireless device.

The lending wireless device sets the destination MAC address in the packet to that of the borrowing wireless device, and sets the MAC receiver address in the packet to that of the AP (i.e. GO device 102), and uses its own MAC address as the source MAC address.

In response to receiving a packet, the borrowing wireless device determines which TCP/IP stack to forward the packet to by inspecting the 802.11 Source MAC address in the packet, where this address is the same as the 802.11 Destination MAC address which is used when sending packets from the borrowing device towards the WAN.

Option 2: MPTCP with IP/IPsec Tunnel Based Forwarding

With Option 2, multiple IP tunnels or IPsec tunnels can be established between a borrowing wireless device and multiple lending wireless devices. For example, in FIG. 3, a first tunnel can be established between Device 1 (the borrowing wireless device) and Device 2 (a first lending wireless device), and a second tunnel can be established between Device 1 and Device 3 (a second lending wireless device).

The borrowing wireless device (Device 1) can perform concurrent communications over the multiple tunnels using MPTCP.

Figure 6:
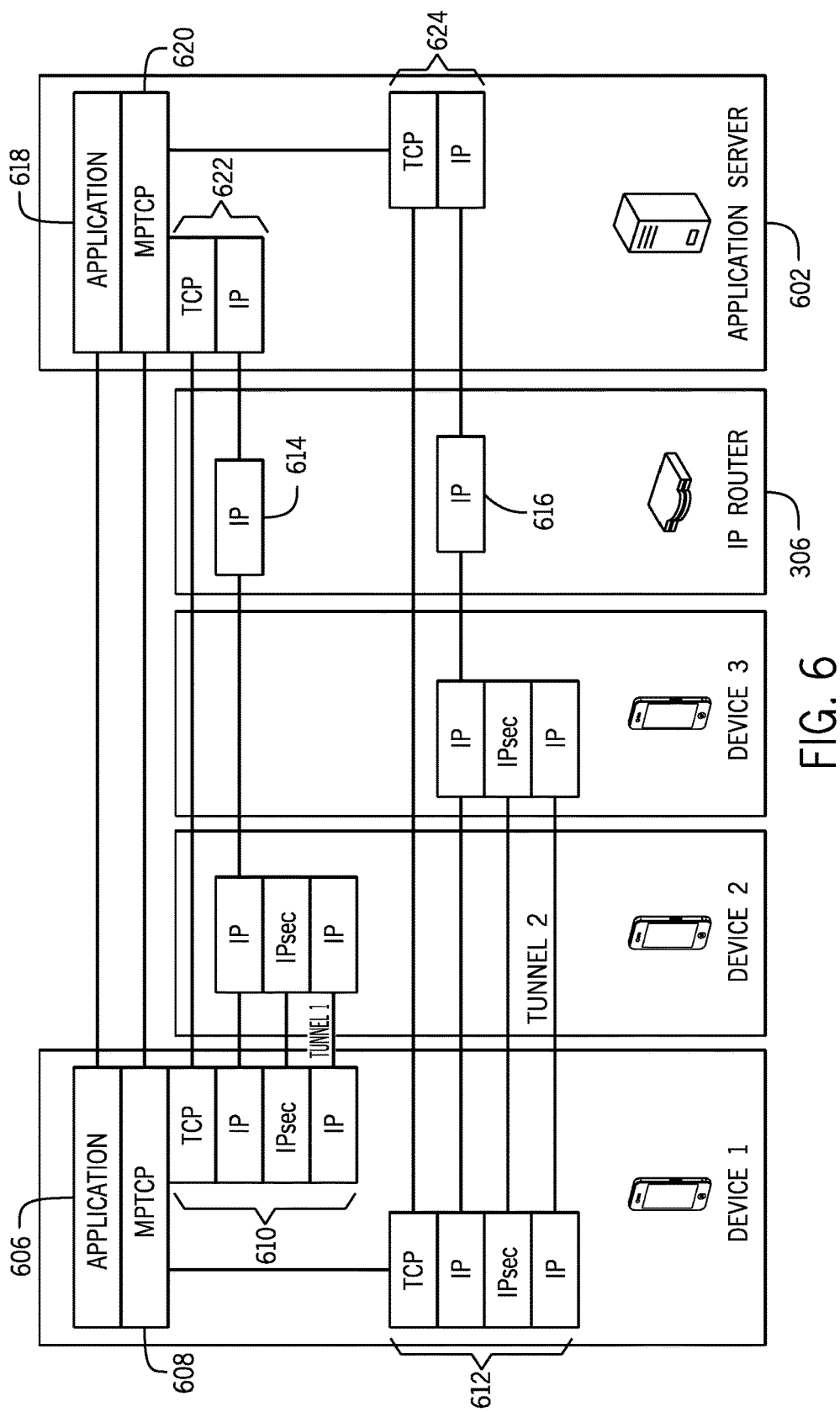
FIG. 6 is a block diagram of layers in various devices, according to some implementations.

The layers of various devices are illustrated in FIG. 6. The devices shown in FIG. 6 include Device 1, Device 2, and Device 3, which are the P2P client devices of the Wi-Fi Direct group. In addition, FIG. 6 shows the IP router 306 and an MPTCP application server 602.

Device 1 includes an application 606, an MPTCP layer 608, and two protocol stacks 610 and 612. Each protocol stack 610 or 612 includes an outer IP layer, an IPsec layer above the outer IP layer, an inner IP layer above the IPsec layer, and a TCP layer above the inner IP layer. Device 1 and Device 2 can establish a first tunnel (Tunnel 1) using the IPsec/IP stack of the protocol stack 610 in Device 1 and the corresponding IPsec/IP stack in Device 2, and Device 1 and Device 3 can establish a second tunnel (Tunnel 2) using the IPsec/IP stack of the protocol stack 612 in Device 1 and the corresponding IPsec/IP stack in Device 3.

The IP router 306 includes IP layers 614 and 616 to route packets transmitted through the respective first and second tunnels.

The application server 602 includes an application 618, an MPTCP layer 620, a first TCP/IP stack 622 to communicate with the first protocol stack 610 of Device 1, and a second TCP/IP stack 624 to communicate with the second protocol stack 612 of Device 1.

Device IP Address Management

With Option 2, the GO device 102 allocates multiple IP addresses, one for each TCP/IP stack underneath the MPTCP layer (one for each lending wireless device).

Forwarding of Packets Originating in the Borrowing Wireless Device

The device MPTCP layer 608 selects the TCP/IP stack (from among multiple TCP/IP stacks in Device 1) on which to forward a packet.

The source IP address of both inner and outer IP headers of the packet is set to be the IP address allocated by the GO device 102 to Device 1 (different source IP addresses for each TCP/IP stack underneath the MPTCP layer 608).

The destination IP address of the inner IP header is set to the IP address of the MPTCP application server 602. The destination IP address of the outer IP header is set to the IP address of the lending wireless device that is associated with the respective TCP/IP stack. The borrowing wireless device learns the IP addresses of available lending wireless devices through the solutions in Section 5.

At the lending wireless device the inner IP packet is extracted from the tunnel (outer IP layer removed) and may be passed through a NAT, and then forwarded on to the WAN 310.

Forwarding of Packets Terminating in the Borrowing Wireless Device

The MPTCP layer and TCP/IP layers in the application server 602 behave as per a regular MPTCP application server.

On receiving an IP packet from the WAN, the lending wireless device may perform network address translation. The IP packet can then be carried in the IP tunnel toward the wireless device. The borrowing wireless device routes the packet to the appropriate TCP/IP stack based on the destination IP address.

Option 3: MPTCP with Source IP Address Based Routing

Option 3 combines MPTCP with IP address based routing using the next-hop-router table 320 described in Section 6.

Device IP Address Management

With Option 3, the GO device 102 allocates the borrowing wireless device with a separate IP address for each of the available lending wireless devices that the borrowing wireless device can use, according to techniques described in Solution 6.

Configuration of Next Hop Routers

Option 3 makes use of the next-hop-router table 320 in the GO device 102 as described in Section 6. The difference with the solution of Section 6 is that a single borrowing wireless device may have multiple entries in the table, one entry for each of its multiple IP addresses, with each of these IP addresses associated with a different next hop router (i.e. different lending wireless device).

Forwarding of Packets Originating in the Borrowing Wireless Device

The MPTCP layer in the borrowing wireless device selects the TCP/IP stack (from among multiple TCP/IP stacks) to use for sending a packet.

The source IP address in the packet is set to the IP address associated with that respective TCP/IP stack.

The Ethernet destination MAC address in the packet is set to the MAC address of the GO device 102.

Upon receiving the packet, the GO device 102 inspects the source IP address in the packet and determines which lending wireless device to forward the packet, according to the next hop router table 320. The GO device 102 then forwards the packet to the appropriate lending wireless device by setting the destination MAC address to the MAC address of the lending wireless device.

In response to receiving the packet, the lending wireless device may pass the IP packet through a NAT, and then forwards the packet to the WAN 310.

Forwarding Packets Terminating at the Borrowing Wireless Device

The MPTCP layer and the TCP/IP stacks in the MPTCP application server behave as per a regular MPTCP application server.

In response to receiving the IP packet from the WAN 310, the lending wireless device may perform network address translation.

The lending wireless device forwards the packet to the GO device 102, and the GO device 102 routes the packet to the borrowing wireless device in the usual way (by inspecting destination IP address).

In response to receiving the packet, the borrowing wireless device knows which TCP/IP stack to forward the packet to because each stack is associated with a different destination IP address.

General Notes on Options 1, 2, and 3

The general notes for the solutions of Sections 4, 5, and 6 as discussed above are also applicable to Options 1, 2, and 3.

8. Using IP Flow Mapping to Exploit Multiple WAN Connections

Solutions described in this section can be used to address Issue 3.

The solutions in this section are the same as solutions described in Section 7, and can utilize Options 1, 2, and 3, but with the difference that instead of using an MPTCP shim layer above the TCP/IP stacks the borrowing wireless device instead maps different end-user applications to the different IP stacks. The borrowing device can be allocated a different IP address for each lending wireless device that the borrowing wireless device is using.

9. Using Host Based IP Capability Augmented by Information Provided by a GO Device The solutions described in this section can be used to address Issue 5.

In this solution a node acts as an IP session mobility anchor point. This IP session mobility anchor node may also provide security gateway functionality.

Generic Solution Description

The solution involves a number of operations.

As a trigger condition, the GO device determines that WAN connectivity for borrowing wireless device X is to be switched from being provided by lending wireless device Y to being provided by lending wireless device Z. This may be because the lending wireless device Y which was previously providing WAN connectivity has lost WAN coverage or may be because the borrowing wireless device X which is borrowing the WAN connectivity has used up its allowance (number of bytes granted by the lending wireless device Y).

The GO device may for example learn the foregoing information via the distributed hotspot application which is in communication with lending wireless devices.

In response to the trigger condition, the application server in the GO device performs a notification operation by notifying borrowing wireless device X that its external facing source IP address has changed, due to the switch of lending wireless devices. The notification may be achieved through a new procedure, or may be implicit as part of any of the procedures described in Sections 4, 5, and 6.

Next, the borrowing wireless device X notifies the mobility anchor/security gateway that its IP address has changed.

The mobility anchor/security gateway starts tunneling downlink traffic toward the new IP address for the borrowing wireless device X.

MOBIKE Implementation

In specific implementations, Mobility and Multi-homing Protocol (MOBIKE) can be used, where MOBIKE is a mobility and multihoming extension to Internet Key Exchange (IKEv2). Note that IKEv2 is the control plane signaling protocol used to establish a secure IPsec tunnel between a device and a security gateway (VPN gateway). The IPsec tunnel supports encryption of traffic at the IP layer and prevents intermediary networks from being able to read the information being carried on the tunnel.

Unlike conventional IKEv2, MOBIKE additionally allows the IP addresses associated with IKEv2 and tunnel mode IPsec Security Associations to change. Hence, a MOBIKE client can keep the connection with the VPN gateway active while the IP address allocated to the mobile node is changing.

Figure 7:
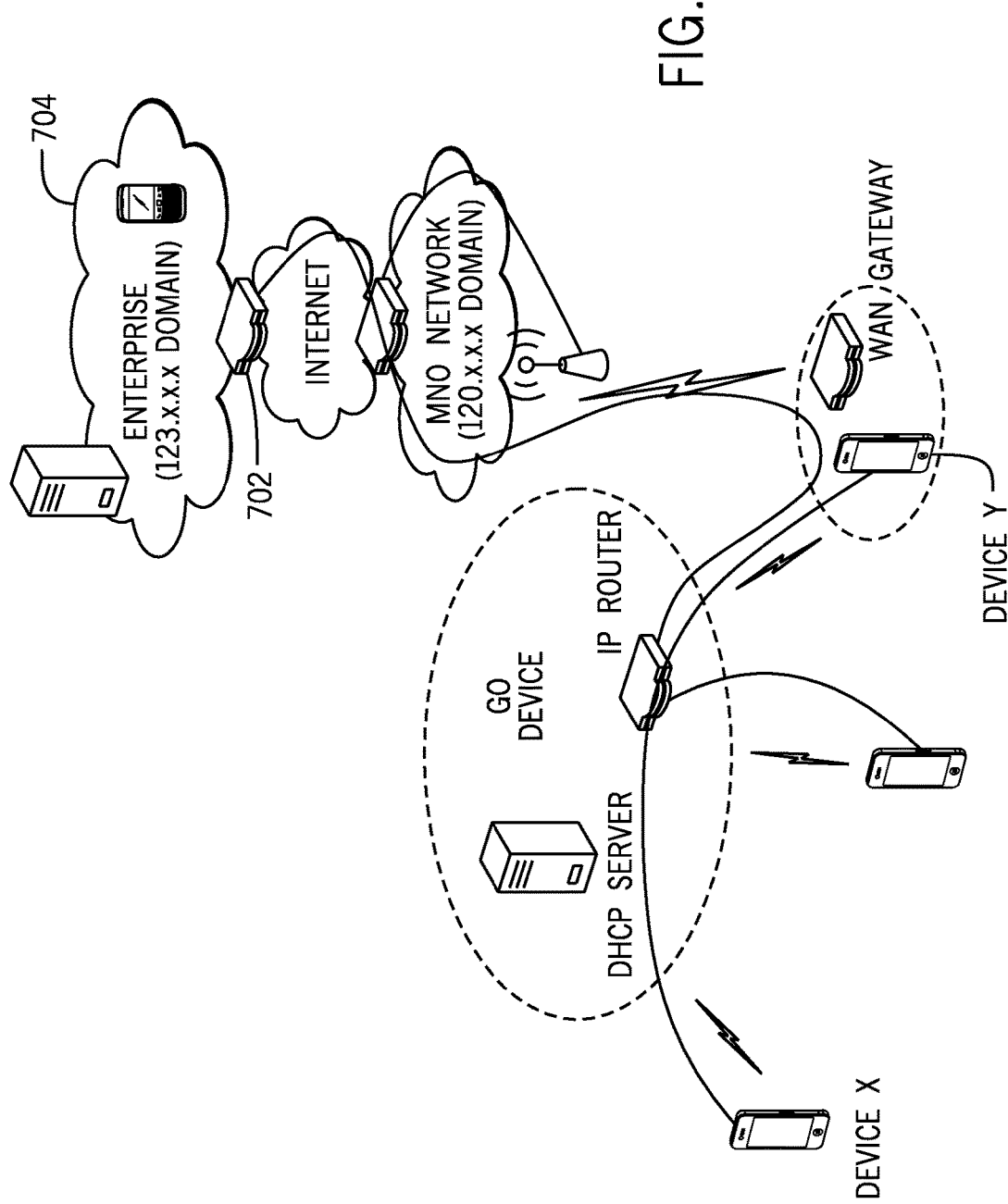
FIG. 7 is a block diagram of an example network arrangement, according to some implementations.

With the MOBIKE implementation, as shown in FIG. 7, borrowing wireless device X builds a VPN tunnel over the Wi-Fi Direct distributed hotspot network, to a security gateway 702 located in the user's enterprise network 704. The VPN supports IP address mobility. In this example the MOBIKE extensions to IKEv2 can be used.

Note that building an IPsec VPN between a wireless device and the VPN security gateway 702 in the user's enterprise network 704 solves one of the problems in distributed hotspot, which is to avoid any other device in the Wi-Fi Direct network from intercepting and reading traffic.

FIG. 7 also shows Device Y which shares its WAN connectivity with another wireless device, such as Device X.

Figure 8:
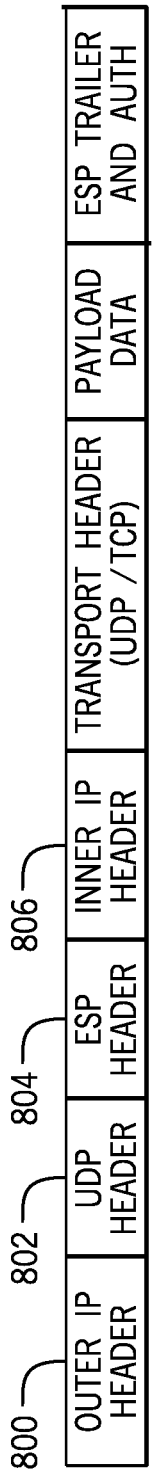
FIG. 8 illustrates elements of a packet according to some examples.

Wi-Fi Direct can utilize a private IPv4 network to provide interconnectivity between wireless devices and the GO device. WAN connected devices can be expected to use a NAT in order to share their single WAN connected IP address (in this example allocated by the cellular operator)

with multiple other devices in the Wi-Fi Direct network. The use of a NAT with an IPsec tunnel involves the implementation of a NAT traversal solution. In this example, as shown in FIG. 8, the NAT traversal solution is to insert a UDP header 802 between the outer IP header 800 and the IPsec header 804 and inner IP header 806. MOBIKE supports NAT traversal. FIG. 8 also shows other elements of a packet.

Relating this MOBIKE example to the generic solution description section above, a new element is the notification operation discussed above, in which the notification from the GO device to the borrowing wireless device that the lending wireless device has changed (which could be explicit or implicit as part of solutions in Section 4, 5, or 6) triggers the borrowing device to send an IKEv2 UPDATE_SA_ADDRESSES notification message to the security gateway 702 in the enterprise network 704. The security gateway 702 records the IP header information (IP source address and UDP source port numbers) on which this IKEv2 message was transmitted and starts using these new IP address/port numbers for the routing of traffic associated with this particular security association (of borrowing wireless device X).

System Architecture

Figure 9:
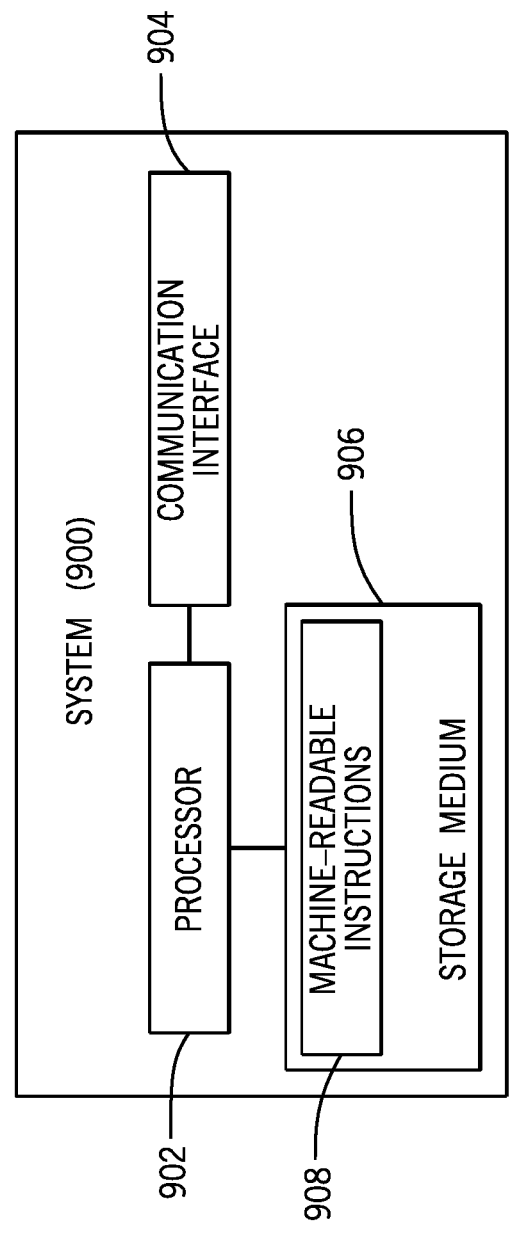
FIG. 9 is a block diagram of an example system according to some implementations.

FIG. 9 is a block diagram of an example system 900, which can be a wireless device, such as a borrowing wireless device, a lending wireless device, or a group device. Alternatively, the system 900 can be a different type of system.

The system 900 includes a processor 902 (or multiple processors), a communication interface 904 to communicate over a network, and a non-transitory machine-readable or computer-readable storage medium 906 to store machine-readable instructions 908 that are executable on the processor(s) 902.

A processor can include a microprocessor, a core of a multi-core microprocessor, a microcontroller, a programmable integrated circuit, a programmable gate array, or another hardware processing circuit.

The storage medium 906 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first wireless device, comprising:
a communication interface;
at least one processor coupled to the communication interface and configured to:
receive from a group device that wirelessly interconnects a plurality of wireless devices in a group, a message containing information identifying a second wireless device from which the first wireless device is able to use wireless connectivity of the second wireless device to a wide area network (WAN), the second wireless device being part of the plurality of wireless devices;
determine whether a packet is destined for the WAN or a local network different from the WAN;
in response to determining that the packet is destined for the WAN, transmit the packet to the second wireless device, wherein the packet includes a network address of the second wireless device, and the network address comprises a Medium Access Control (MAC) address or an Internet Protocol (IP) address, and wherein the second wireless device is to forward the packet to the WAN; and
in response to determining that the packet is destined for the local network, include, in the packet, a first network address corresponding to a network address in a network address range of the local network as a destination network address in the packet.

2. The first wireless device of claim 1, wherein the message containing the information identifying the second wireless device comprises a Dynamic Host Configuration Protocol (DHCP) message.

3. The first wireless device of claim 1, wherein the first network address is a MAC address, and the network address range is an IP address range.

4. A method of a first wireless device, comprising:
communicating, by the first wireless device, with a group device that wirelessly interconnects a plurality of wireless devices in a group, to obtain, from the group device, information identifying a second wireless device from which the first wireless device is able to use wireless connectivity of the second wireless device to a wide area network (WAN), the second wireless device being part of the plurality of wireless devices;
communicating, by the first wireless device, data over the WAN using the wireless connectivity of the second wireless device;
indicating, in the first wireless device, a control element in a user interface screen, the control element selectable by a user to indicate that the first wireless device is using or is to use wireless connectivity to a WAN of another wireless device in the group; and
in response to selection of the control element by the user, sending, by the first wireless device to a server in the group device, an indication that the first wireless device is requesting borrowing of the wireless connectivity of the another wireless device.

5. The first wireless device of claim 1, wherein the information identifying the second wireless device is one of a MAC address, an IP address, or a device name of the second wireless device.

6. The first wireless device of claim 1, wherein the at least one processor is configured to further:
obtain the IP address of the second wireless device; and
establish a security tunnel with the second wireless device using the IP address.

7. The first wireless device of claim 6, wherein the security tunnel is an IP Security (IPsec) tunnel.

8. The method of claim 4, wherein the server in the group device to which the indication is sent comprises a Hypertext Transfer Protocol (HTTP) server.

9. The method of claim 4, further comprising:
displaying, by the first wireless device in the user interface screen, identifiers of selected wireless devices in the group that are able to lend wireless connectivities of the selected wireless devices to another wireless device in the group.

10. The method of claim 9, further comprising:
receiving, by the first wireless device, a selection by the user of a first identifier of the identifiers of the selected wireless devices, the first identifier being an identifier of the second wireless device.

11. A method of a first wireless device, comprising:
communicating, by the first wireless device, with a group device that wirelessly interconnects a plurality of wireless devices in a group, to obtain, from the group device, information identifying second wireless devices from which the first wireless device is able to borrow wireless connectivities of the second wireless devices to a wide area network (WAN), the second wireless devices being part of the plurality of wireless devices;
transmitting, by the first wireless device, a plurality of packets for communication to the WAN by using the borrowed wireless connectivities of the second wireless devices in the group;
determining whether a first packet is destined for the WAN or a local network different from the WAN;
in response to determining that the first packet is destined for the WAN, transmit the first packet to a given second wireless device, wherein the first packet includes a network address of the given second wireless device, and the network address comprises a Medium Access Control (MAC) address or an Internet Protocol (IP) address, and wherein the given second wireless device is to forward the first packet to the WAN; and
in response to determining that the first packet is destined for the local network, include, in the first packet, a first network address corresponding to a network address in a network address range of the local network as a destination network address in the first packet.

12. The method of claim 11, wherein transmitting the packets comprises using a plurality of protocol stacks in the first wireless device, the plurality of protocol stacks forwarding the packets to the respective second wireless devices.

13. The method of claim 12, wherein transmitting the packets using the plurality of protocol stacks comprises using a Multipath Transmission Control Protocol (MPTCP).

14. The method of claim 12, wherein transmitting the packets using the plurality of protocol stacks comprises using flow mapping that causes traffic of different applications to be forwarded to different protocol stacks of the plurality of protocol stacks.

* * * * *